United States Patent
Hutcheon et al.

(10) Patent No.: US 11,754,173 B2
(45) Date of Patent: Sep. 12, 2023

(54) SYSTEMS FOR SHAFT SPEED SENSING

(71) Applicant: GM GLOBAL TECHNOLOGY OPERATIONS LLC, Detroit, MI (US)

(72) Inventors: Angela M Hutcheon, Shelby Township, MI (US); Joel H Gunderson, Canton, MI (US); Roman Shestakov, Waterford, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 17/650,930

(22) Filed: Feb. 14, 2022

(65) Prior Publication Data

US 2023/0258262 A1    Aug. 17, 2023

(51) Int. Cl.
*G01P 3/44* (2006.01)
*F16H 59/12* (2006.01)

(52) U.S. Cl.
CPC .............. *F16H 59/12* (2013.01); *G01P 3/44* (2013.01)

(58) Field of Classification Search
CPC .................................. F16H 59/42; G01P 3/44
See application file for complete search history.

(56) References Cited

U.S. PATENT DOCUMENTS

| | | | |
|---|---|---|---|
| 6,522,133 B1* | 2/2003 | Haupt | F16H 59/36 324/207.2 |
| 9,618,087 B2* | 4/2017 | Mellet | F16H 3/66 |
| 2020/0173543 A1* | 6/2020 | Jehle | F16H 59/68 |
| 2021/0086557 A1* | 3/2021 | Love | G01P 3/44 |

FOREIGN PATENT DOCUMENTS

| | | | | |
|---|---|---|---|---|
| CN | 111351662 A | * | 6/2020 | F01D 5/02 |
| DE | 102016105293 B4 | * | 10/2018 | F16H 3/44 |
| EP | 2607856 A2 | * | 6/2013 | G01D 5/147 |

* cited by examiner

*Primary Examiner* — Justin Holmes
(74) *Attorney, Agent, or Firm* — Lorenz & Kopf LLP (57) ABSTRACT

A transmission system associated with a vehicle includes a shaft to rotate about an axis of rotation. The shaft is coupled to a gear set. The transmission system includes a sensor target to be coupled to the gear set and to rotate with the gear set. The sensor target includes at least one target. The transmission system includes a sensor spaced apart from the sensor target by a gap. The sensor is configured to observe the at least one target of the sensor target to determine a rotation speed of the shaft.

20 Claims, 6 Drawing Sheets

SYSTEMS FOR SHAFT SPEED SENSING

INTRODUCTION

The technical field generally relates to systems for sensing a speed of a rotating shaft, and more particularly relates to systems for sensing a speed of a rotating shaft associated with a transmission of a vehicle.

In the example of a vehicle, a transmission transmits power from the engine to the vehicle wheels at selectable speed ratios. In the example of an automatic transmission, the transmission may include a torque converter, which transfers torque from an output shaft of the engine to an input shaft of the transmission. Due to the torque converter, the input shaft may rotate at a speed that is different than the output shaft of the engine. Generally, the transmission switches between various gear ratios based on a rotation speed of the input shaft. In order to determine the rotation speed of the input shaft, a sensor may be employed to observe the input shaft as it rotates. Due to the construction of the transmission, however, it may be difficult to observe the input shaft as it rotates.

Thus, it is desirable to provide systems for shaft speed sensing, which enable a sensor to observe a rotation of a shaft, such as an input shaft associated with a transmission, to determine a speed of the shaft. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a transmission system associated with a vehicle. The transmission system includes a shaft configured to rotate about an axis of rotation. The shaft is coupled to a gear set. The transmission system includes a sensor target to be coupled to the gear set and configured to rotate with the gear set. The sensor target includes at least one target. The transmission system includes a sensor spaced apart from the sensor target by a gap. The sensor is configured to observe the at least one target of the sensor target to determine a rotation speed of the shaft.

The sensor target includes a body and a target flange, and the at least one target is defined in the target flange. The target flange extends axially from the body and forms an outer perimeter of the sensor target. The gear set is a planetary gear set including a carrier coupled to a planet gear and to the shaft, and the body includes at least one coupling flange that extends radially from the body to be coupled to the carrier of the planetary gear set. The at least one target includes a plurality of windows, which are defined through the sensor target so as to be spaced evenly apart about a perimeter of the sensor target. The sensor is a back biased tunnel magnetoresistance sensor, and the sensor target is devoid of one or more magnets. The sensor target is composed of a ferrous material.

Further provided according to various embodiments is a vehicle. The vehicle includes a transmission system including a shaft configured to rotate about an axis of rotation. The shaft includes a planetary gear set coupled to the shaft that is configured to rotate with the shaft. The vehicle includes a shaft sensing system configured to observe a rotation of the shaft about the axis of rotation. The shaft sensing system includes a sensor target coupled to the planetary gear set associated with the shaft. The sensor target including at least one window and devoid of one or more magnets. The shaft sensing system includes a back biased tunnel magnetoresistance sensor spaced apart from the sensor target by a gap. The back biased tunnel magnetoresistance sensor is configured to generate a magnetic field and to observe the at least one window of the sensor target to determine a rotation speed of the shaft.

The shaft is an input shaft of the transmission system. A non-ferrous torque transfer housing is positioned within the gap between the back biased tunnel magnetoresistance sensor and the sensor target, and the non-ferrous torque transfer housing is configured to rotate independently of the shaft. The back biased tunnel magnetoresistance sensor is coupled to a housing associated with the transmission system, and the back biased tunnel magnetoresistance sensor extends along a sensor axis about perpendicular to the axis of rotation of the shaft. The sensor target includes a body and a target flange, and the at least one window is defined in the target flange. The target flange extends axially from the body and forms an outer perimeter of the sensor target. The body includes at least one coupling flange that extends radially from the body to be coupled to a carrier of the planetary gear set, and the carrier of the planetary gear set is coupled to a planet gear and to the shaft. The at least one window includes a plurality of windows, which are defined through the sensor target so as to be spaced evenly apart about a perimeter of the sensor target. The sensor target is composed of a ferrous material.

Also provided is a vehicle that includes a transmission system. The transmission system includes a shaft configured to rotate about an axis of rotation. The shaft includes a planetary gear set having a carrier coupled to a planet gear and to the shaft. The vehicle includes a shaft sensing system configured to observe a rotation of the shaft about the axis of rotation. The shaft sensing system includes a sensor target coupled to the carrier of the planetary gear set and configured to rotate with the carrier of the planetary gear set. The sensor target composed of a ferrous material. The sensor target includes a body and a target flange that forms an outer perimeter of the sensor target. The target flange extends axially from the body and defines a plurality of windows evenly spaced apart about a perimeter of the target flange. The sensor target is devoid of one or more magnets. The shaft sensing system includes a back biased tunnel magnetoresistance sensor spaced apart from the sensor target by a gap. The back biased tunnel magnetoresistance sensor is configured to generate a magnetic field and to observe the plurality of windows of the sensor target to determine a rotation speed of the shaft.

A non-ferrous torque transfer housing is positioned within the gap between the back biased tunnel magnetoresistance sensor and the sensor target, and the non-ferrous torque transfer housing is configured to rotate independently of the shaft. The back biased tunnel magnetoresistance sensor is coupled to a housing associated with the transmission system, and the back biased tunnel magnetoresistance sensor extends along a sensor axis about perpendicular to the axis of rotation of the shaft. The body includes at least one coupling flange that extends radially from the body to be coupled to the shaft.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the shaft sensing system described herein is merely exemplary embodiments of the present disclosure.

For the sake of brevity, conventional techniques related to signal processing, data transmission, signaling, control, machine learning models, radar, lidar, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. Also, as used herein, the term "about" denotes within 5% to account for manufacturing tolerances.

Figure 1:
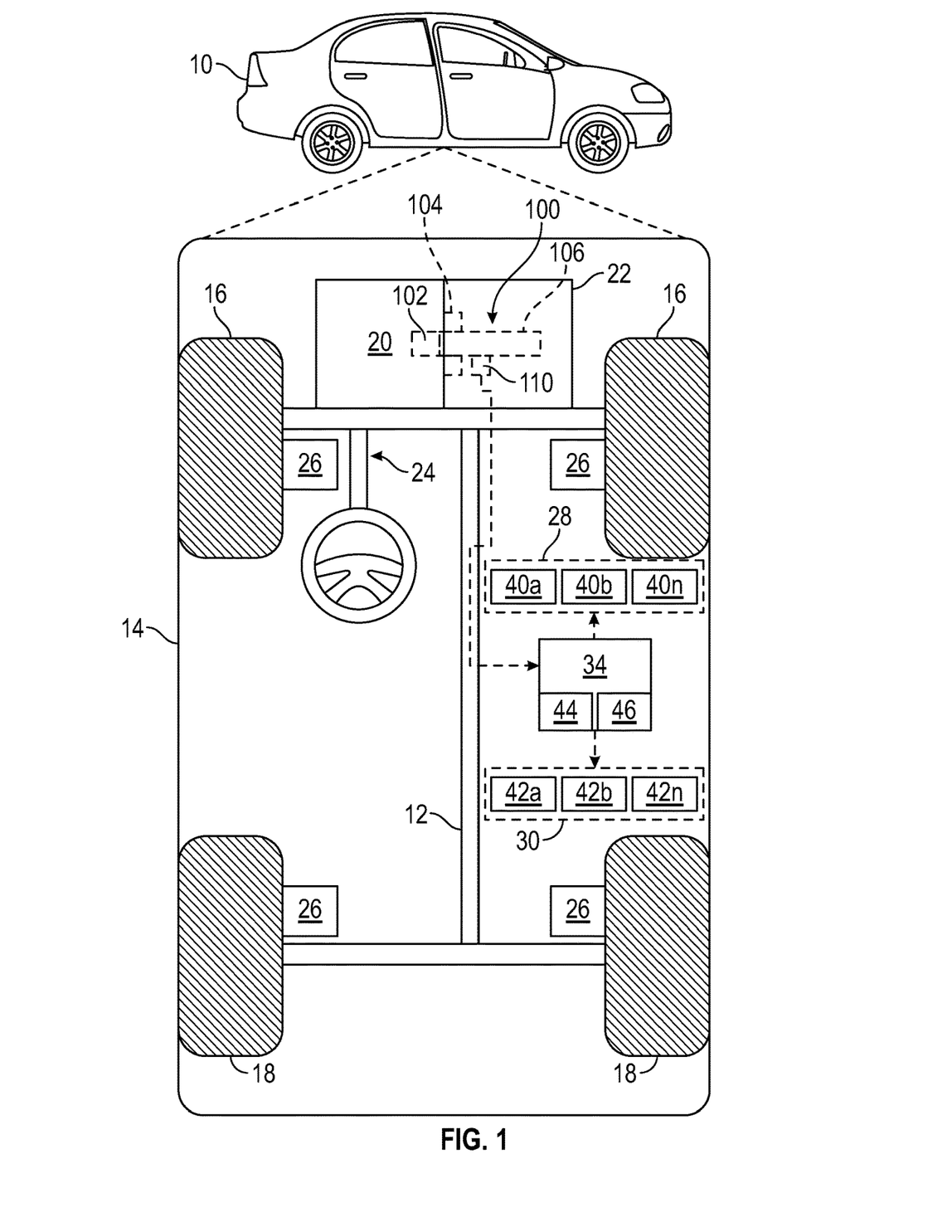
FIG. 1 is a functional block diagram illustrating a vehicle including a transmission system having a shaft sensing system in accordance with various embodiments.

With reference to FIG. 1, a shaft sensing system shown generally as 100 is associated with a vehicle 10 in accordance with various embodiments. In general, the shaft sensing system 100 observes a speed of a rotating shaft, such as an input shaft 106 of a transmission system 22, and generates sensor signals for use in controlling the transmission system 22 of the vehicle 10. As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16, 18 are each rotationally coupled to the chassis 12 near a respective corner of the body 14.

In various embodiments, the vehicle 10 is an autonomous vehicle or a semi-autonomous vehicle. As can be appreciated, the shaft sensing system 100 can be implemented in other non-autonomous systems and is not limited to the present embodiments. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used.

As shown, the vehicle 10 generally includes a propulsion system 20, the transmission system 22, a steering system 24, a brake system 26, a sensor system 28, an actuator system 30, and at least one controller 34. The propulsion system 20 may, in various embodiments, include an internal combustion engine, an electric machine such as a traction motor, and/or a fuel cell propulsion system. The propulsion system 20 generally has an output shaft or crankshaft 102, which is coupled to the transmission system 22. The transmission system 22 is configured to transmit power received from the crankshaft 102 of the propulsion system 20 to the wheels 16, 18 according to selectable speed ratios.

The brake system 26 is configured to provide braking torque to the wheels 16, 18. Brake system 26 may, in various embodiments, include friction brakes, brake by wire, a regenerative braking system such as an electric machine, and/or other appropriate braking systems. The steering system 24 influences a position of the wheels 16 and/or 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. In various embodiments, the sensing devices 40a-40n include, but are not limited to, radars (e.g., long-range, medium-range-short range), lidars, global positioning systems, optical cameras (e.g., forward facing, 360-degree, rear-facing, side-facing, stereo, etc.), thermal (e.g., infrared) cameras, ultrasonic sensors, odometry sensors (e.g., encoders) and/or other sensors that might be utilized in connection with systems and methods in accordance with the present subject matter.

The actuator system 30 includes one or more actuator devices 42a-42n that control one or more vehicle features such as, but not limited to, the propulsion system 20, the transmission system 22, the steering system 24, and the brake system 26. In various embodiments, the vehicle 10 may also include interior and/or exterior vehicle features not illustrated in FIG. 1, such as various doors, a trunk, and cabin features such as air, music, lighting, touch-screen display components (such as those used in connection with a navigation system), and the like.

The controller 34 includes at least one processor 44 and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling systems of the vehicle 10. The controller 34 is in communication with the shaft sensing system 100 via a communication medium that facilitates the transfer of data, power, etc.

Figure 2:
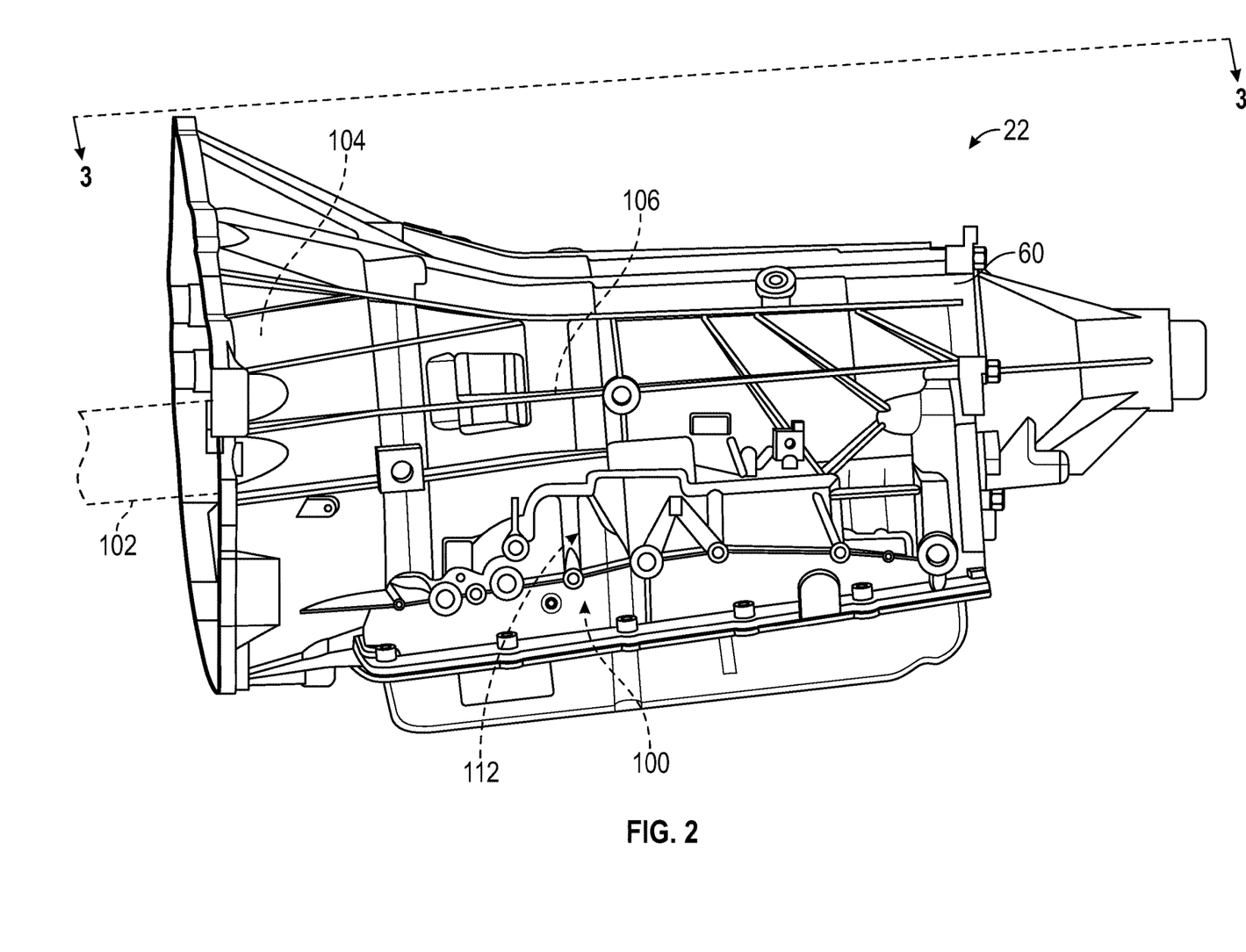
FIG. 2 is a perspective view of the transmission system of FIG. 1, in which the shaft sensing system is disposed within a case of the transmission system.

With reference to FIG. 2, a perspective view of the transmission system 22 is shown. According to various embodiments, the transmission system 22 is a ten speed automatic transmission. The transmission system 22 includes a torque converter 104, which is coupled to the crankshaft 102 of the propulsion system 20. The torque converter 104 enables the propulsion system 20 to move independently of the transmission system 22, and uses torque received from the crankshaft 102 to drive an input shaft 106 of the transmission system 22. Thus, the crankshaft 102 of the propulsion system 20 may be rotating at a speed different than the speed of the input shaft 106 due to the torque converter 104. The shaft sensing system 100, which is disposed within a case 60 of the transmission system 22, enables the determination of the rotation speed of the input shaft 106 to ensure the proper selection of gears within the transmission system 22.

Figure 3:
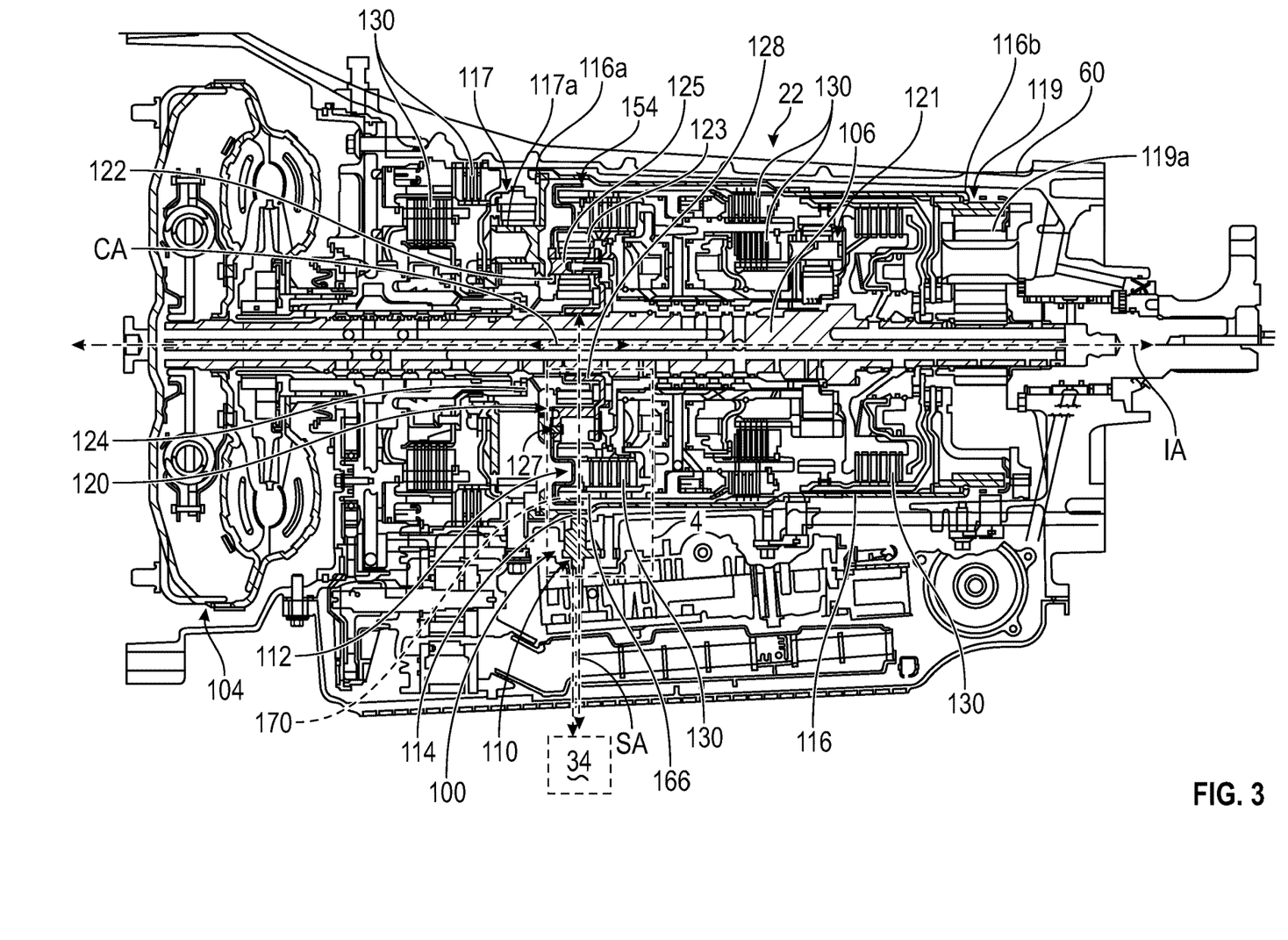
FIG. 3 is a cross-sectional view of the transmission system of FIG. 2, taken along line 3-3 of FIG. 2.

With reference to FIG. 3, a cross-sectional view of the transmission system 22 is shown. The transmission system 22 includes a plurality of planetary gear sets 117, 119, 120, 121 and a plurality of clutches 130 that cooperate to supply power to the wheels 16 and/or 18 (FIG. 1). In one example, the transmission system 22 includes four planetary gear sets 117, 119, 120, 121 and six clutches 130. The planetary gear sets 117, 119, 120, 121 cooperate with the clutches 130 of the transmission system 22 to transfer torque from the crankshaft 102 to drive the wheels 16 and/or 18. In this example, the shaft sensing system 100 is associated with one of the planetary gear sets 117, 119, 120, 121 to determine the rotation speed and direction of the input shaft 106.

Figure 4:
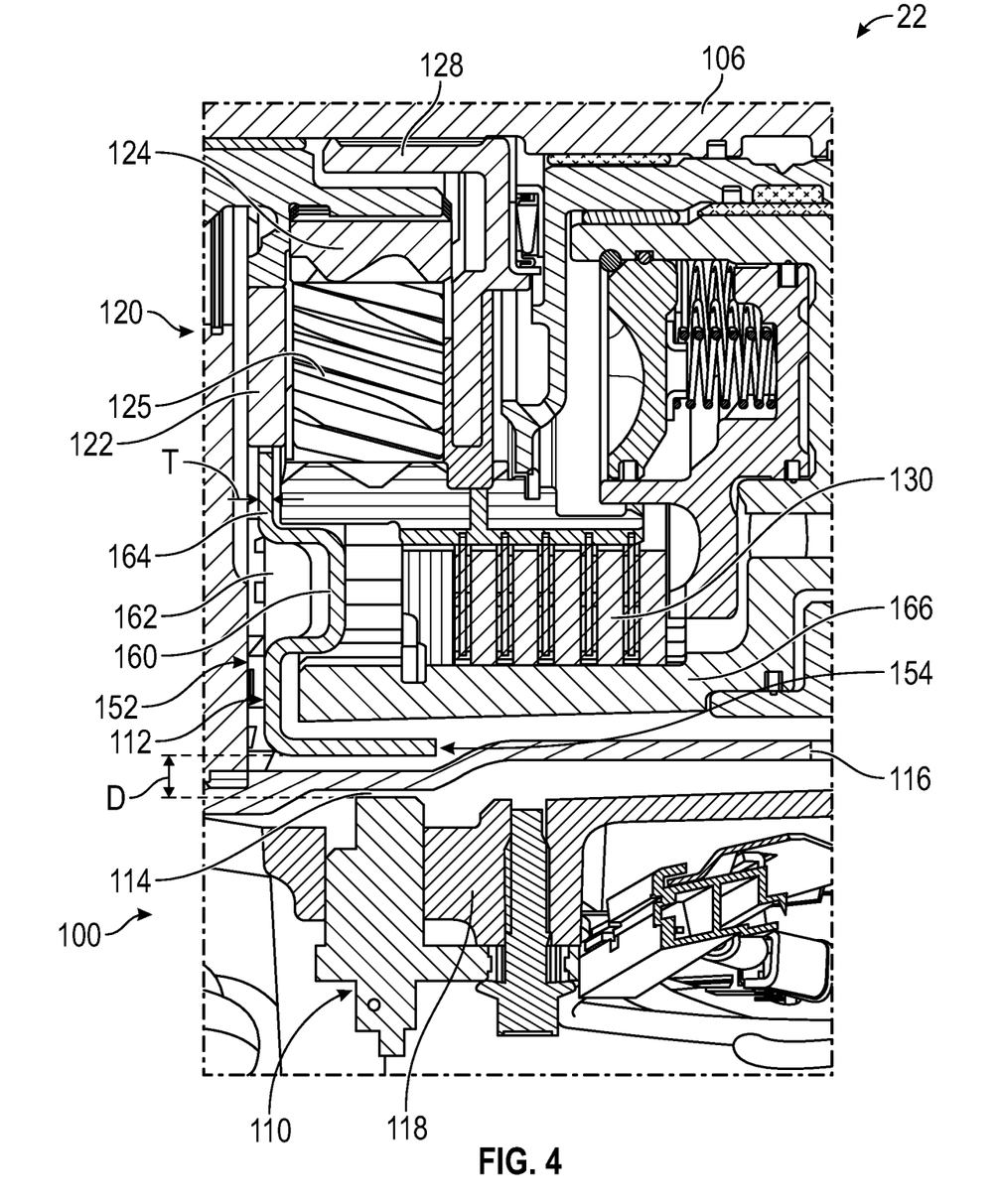
FIG. 4 is a detail view of the transmission system of FIG. 3, taken at 4 on FIG. 3.

In one example, the shaft sensing system 100 includes a sensor 110 and a sensor target 112. Due to the configuration and arrangement of the transmission system 22, in this example and with reference to FIG. 4, the sensor 110 is spaced apart from the sensor target 112 by a distance D. The distance D is about 5.77 millimeters (mm) to about 8.55 millimeters (mm). The distance D defines an air gap 114 between the sensor 110 and the sensor target 112. In addition, disposed within the air gap 114 between the sensor 110 and the sensor target 112 is a transmission torque transfer housing 116. The transmission torque transfer housing 116 is cylindrical, and surrounds a portion of the transmission system 22. The transmission torque transfer housing 116 rotates independently of the sensor target 112. The transmission torque transfer housing 116 is composed of a non-ferrous metal or metal alloy, including, but not limited to aluminum. In this example, the sensor 110 observes the sensor target 112 through the transmission torque transfer housing 116. The transmission torque transfer housing 116 results in a metallic barrier between the sensor 110 and the sensor target 112. The transmission torque transfer housing 116 is coupled to a planet 117a of the planetary gear set 117 at one end 116a, and is coupled to a planet 119a of the planetary gear set 119 at a second, opposite end 116b. The transmission torque transfer housing 116 carries torque from the planetary gear set 117 to the planetary gear set 119.

The sensor 110 observes the sensor target 112 and generates sensor signals based on the observation. In one example, the sensor 110 is a solid state device that detects a change in a magnetic flux at the sensor 110. In this example, the sensor 110 is a back biased tunnel magnetoresistance (TMR) sensor. The sensor 110 generates sensor signals based on the change in the magnetic flux observed by the sensor 110. As the sensor 110 is back biased, the sensor 110 includes one or more magnets that generate a magnetic field. In one example, the sensor 110 includes one or more rare earth magnets to generate the magnetic field. The sensor 110 is in communication with the controller 34 over the communication media to transmit the sensor signals to the controller 34 and to receive power from the controller 34. Based on the sensor signals, the controller 34 is configured to determine the rotation speed and direction of the input shaft 106. Alternatively, the sensor 110 may include a processor and a storage media, which may determine the rotation speed and direction of the input shaft 106 locally, at the sensor 110, and may transmit the determination to the controller 34. The sensor 110 is coupled to a transmission case 118 associated with the transmission system 22. Generally, the sensor 110 is coupled to the transmission case 118 so as to extend along an axis SA, which is about perpendicular to an axis IA of the input shaft 106 (FIG. 3). The input shaft 106 rotates about the axis IA and the axis IA is an axis of rotation for the input shaft 106. The sensor 110 observes the change in the magnetic flux as a portion of the sensor target 112 rotates relative to the sensor 110. Generally, a sensor housing of the sensor 110 is configured such that a minimal thickness of the sensor housing is disposed between the sensor 110 and the sensor target 112. It should be noted that while the sensor 110 is described herein as comprising a back biased tunnel magnetoresistance (TMR) sensor, different types of sensors may be employed with the sensor target 112 depending upon the size of the distance D between the sensor 110 and the sensor target 112.

With reference back to FIG. 3, the sensor target 112 is coupled to the planetary gear set 120. The planetary gear set 120 is rotatable independently of the planetary gear set 117 and the planetary gear set 119. The planetary gear set 120 includes a carrier 122, a ring gear 123, a sun gear 124 and one or more planet gears 125. The sensor target 112 is coupled to the carrier 122 via one or more rivets 127, however, any suitable mechanical fastener may be employed. The carrier 122 is coupled to each of the planet gears 125, via one or more mechanical fasteners, such as bolts, etc. The carrier 122 is also coupled to the input shaft 106 via splines 128. The carrier 122 rotates with and at the same speed as the input shaft 106. Thus, a rotation of the carrier 122 and the sensor target 112 coupled to the carrier 122 is directly proportional to the rotation speed of the input shaft 106.

Figure 5:
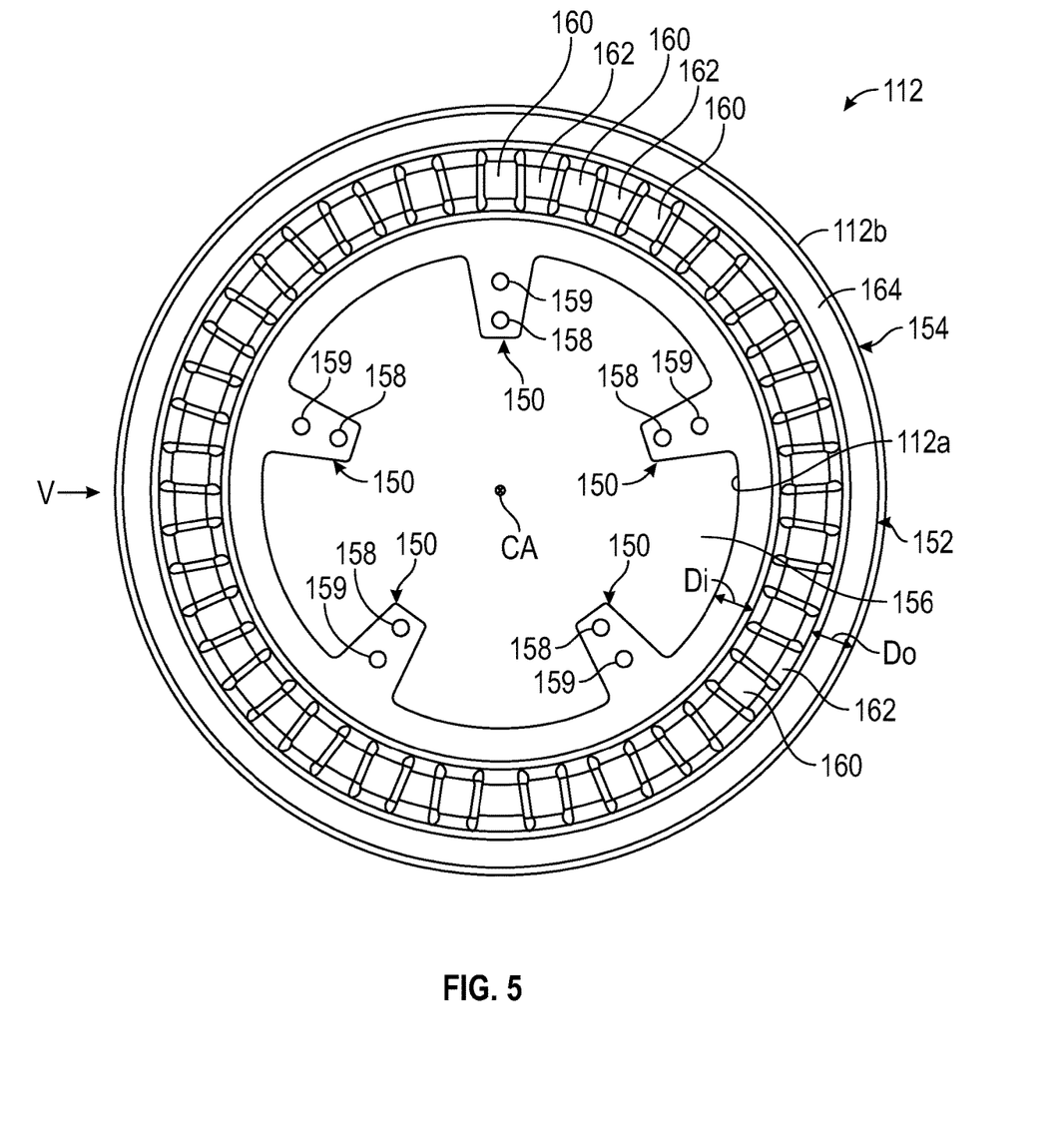
FIG. 5 is a front view of a sensor target of the shaft sensing system.
Figure 6:
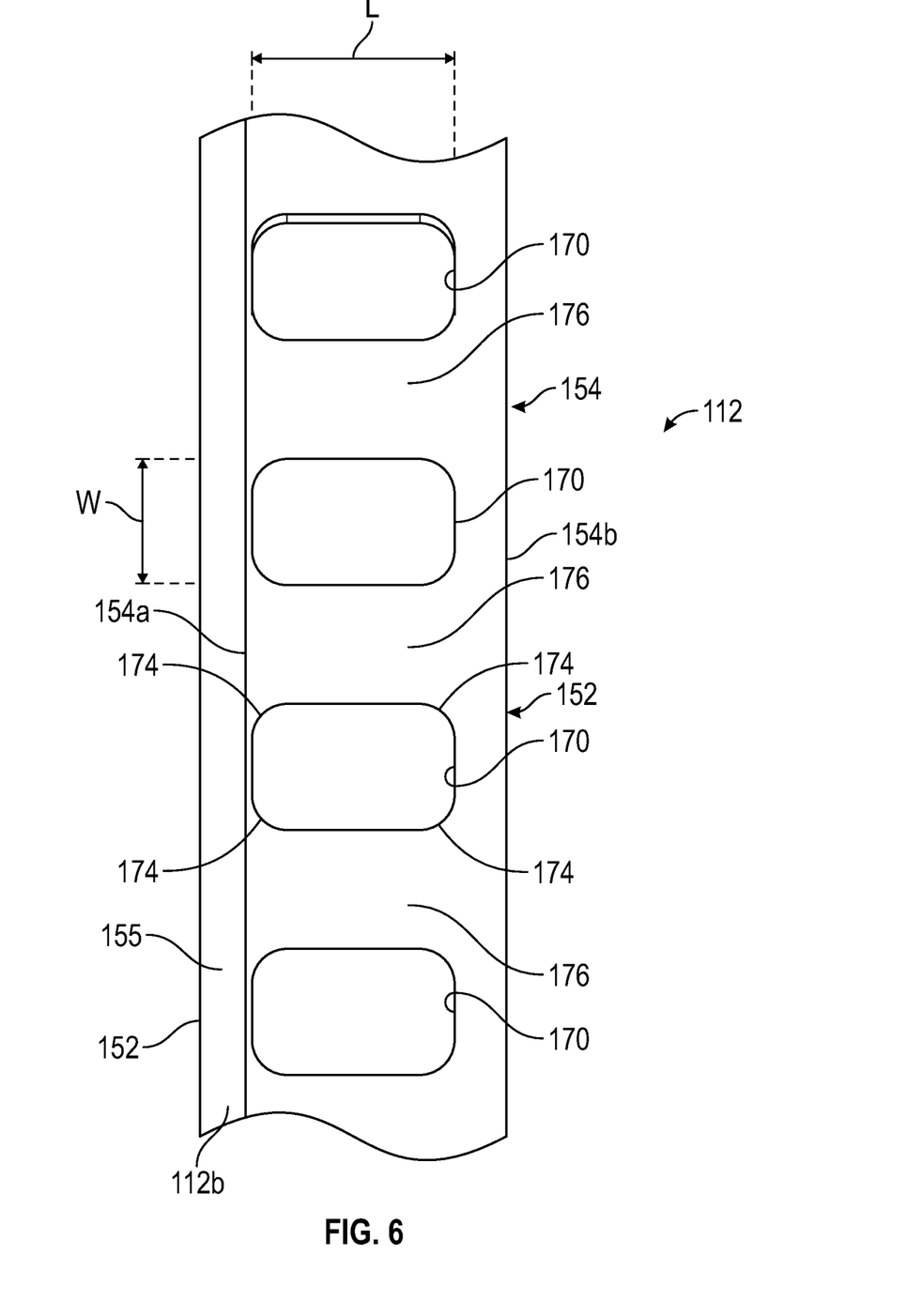
FIG. 6 is a side view of the sensor target of the shaft sensing system, taken from the perspective of V on FIG. 5.

The sensor target 112 is observable by the sensor 110 to determine the rotation speed and direction of the input shaft 106. With reference to FIG. 5, a front view of the sensor target 112 is shown. The sensor target 112 is annular, and is composed of a ferrous metal or metal alloy, such as steel 1010. It should be noted that as the sensor 110 is a back biased tunnel magnetoresistance sensor, the sensor target 112 is composed of a ferrous material, but does not include or is devoid of one or more magnets, which provides a weight savings and reduces manufacturing complexity. In this regard, as the sensor target 112 does not include one or more magnets to generate a magnetic field, the sensor target 112 is manufacturable through stamping, casting, additive manufacturing, etc. Generally, the sensor target 112 is formed as one-piece and is monolithic. The sensor target 112 has a thickness T (FIG. 4), and in one example, the thickness T is about 1.0 millimeters (mm.) to about 3.0 millimeters (mm.).

The sensor target 112 includes at least one or a plurality of coupling flanges 150, a body 152 and a target flange 154. The sensor target 112 also defines a central target bore 156, which enables the sensor target 112 to be positioned about the input shaft 106. The coupling flanges 150 extend radially from the body 152 inward into the central target bore 156. In this example, the sensor target 112 has five coupling flanges 150 spaced apart about an inner diameter 112a of the sensor target 112, however, the sensor target 112 may have any number of coupling flanges 150. The sensor target 112 is asymmetric relative to a central axis CA of the sensor target 112 in this example. The central axis CA is coaxial with the axis IA of the input shaft 106 (FIG. 3). The coupling flanges 150 include a pilot bore 158 and a rivet bore 159. Each of the pilot bores 158 assist in locating the sensor target 112 on the planetary gear set 120 (FIG. 5). Each of the rivet bores 159 receive a corresponding one of the rivets 127 (FIG. 5) to couple the sensor target 112 to the planetary gear set 120 (FIG. 5).

The body 152 defines the inner diameter 112a and extends to an outer diameter 112b of the sensor target 112. In one example, the body 152 includes a plurality of recessed sections 160 defined between the inner diameter 112a and the outer diameter 112b. In one example, the recessed sections 160 are defined so as to be spaced a distance Di apart from the inner diameter 112a, and a distance Do apart from the outer diameter 112b. In this example, distance Di is different and greater than the distance Do such that the recessed sections 160 are offset radially toward the outer diameter 112b. The recessed sections 160 are spaced apart about the perimeter of the body 152. The recessed sections 160 result in the body 152 having an undulating surface about the perimeter of a portion of the body 152. Generally, an aligned section 162 is defined between adjacent ones of the recessed sections 160, and one of the recessed sections 160 alternates with one of the aligned sections 162 about the perimeter of the portion of the body 152. In this example, with brief reference to FIG. 3, each recessed section 160 is misaligned or noncoplanar with a portion of a surface 164 of the body 152 of the sensor target 112, while the aligned section 162 is about coplanar, level or flush with the surface 164. The recessed sections 160 alter a natural frequency of the sensor target 112, which assists in reducing vibrations. In one example, the sensor target 112 is coupled to the carrier 122 so as to be disposed between the transmission torque transfer housing 116 and a clutch housing 166. The clutch housing 166 is composed of a non-ferrous metal or metal alloy, including, but not limited to, aluminum. The clutch housing 166 cooperates to partially enclose one of the clutches 130 associated with the transmission system 22.

The target flange 154 is coupled to or integrally formed with the body 152 at the outer diameter 112b. With reference to FIG. 5, the target flange 154 extends axially outward from the body 152 at the outer diameter 112b of the sensor target 112. Thus, the target flange 154 forms the outer perimeter of the sensor target 112. The target flange 154 has a first target end 154a coupled to or integrally formed with the body 152, and an opposite second target end 154b that defines a terminal end of the target flange 154. In one example, the body 152 is folded at a fold 155 to form the target flange 154. The target flange 154 includes a plurality of targets 170. In one example, the targets 170 comprise a plurality of windows that define non-ferrous areas of the target flange 154, however, it should be understood that the targets 170 may comprise a plurality of teeth that are spaced apart to define non-ferrous areas of the target flange 154. In this example, the target flange 154 includes about 20 windows to about 50 windows, and in one example, includes about 40 windows. Generally, a larger number of the targets 170 increases a resolution of the sensor 110.

The targets 170 are spaced apart about the perimeter of the target flange 154, and thus, the perimeter of the sensor target 112. The targets 170 are generally rectangular, and each target 170 has a width W that is different and less than a length L of the target 170. In one example, the width W is about 5.8 millimeters (mm.) to about 6.8 millimeters (mm.) and the length L is about 9.5 millimeters (mm.) to about 10.5 millimeters (mm.). In this example, each of the targets 170 has rounded corners or fillets 174, which interconnect walls of the targets 170. It should be noted, however, that the targets 170 may have any desired shape to define a non-ferrous area in the target flange 154. With reference to FIG. 3, the targets 170 of the target flange 154 are defined through the target flange 154 such that a center of each of the targets 170 is coaxial with the sensor axis SA of the sensor 110. This enables the targets 170 to be observed by the sensor 110 in instances where the sensor target 112 moves axially relative to the sensor 110 (in a direction parallel to the axis of rotation IA of the input shaft 106). Moreover, the width W and the length L of each of the targets 170 is predetermined to ensure that in the instance of a movement of the sensor target 112 axially relative to the sensor 110 (in a direction parallel to the axis of rotation IA of the input shaft 106), the targets 170 are observed by the sensor 110.

The targets 170 may be formed concurrently during the formation of the sensor target 112, via additive manufacturing or casting, or may be formed by stamping or machining in a secondary operation. Since the targets 170 are spaced apart about the perimeter or circumference of the target flange 154, ferrous sections 176 of the target flange 154 are defined between adjacent ones of the targets 170. In one example, the targets 170 are evenly spaced apart about the perimeter of the target flange 154. One of the ferrous sections 176 of the target flange 154 alternates with one of the targets 170 about the perimeter or circumference of the target flange 154. By providing the windows or targets 170 that are devoid of ferrous material, as the target flange 154 rotates with the input shaft 106, the sensor 110 observes the change in magnetic flux caused by the non-ferrous target 170 passing over or in front of the sensor 110. Generally, as the number of targets 170 about the perimeter of the target flange 154 or the number of targets 170 per revolution is known, the controller 32 is configured to determine the rotation speed and direction of the input shaft 106 based on a number of changes in the magnetic flux (caused by the targets 170 passing over the sensor 110) observed over a predetermined unit of time.

In one example, in order to assemble the sensor target 112 to the input shaft 106, with reference to FIG. 3, the sensor target 112 is formed to include the targets 170. With the planetary gear sets 117, 119, 120, 121 coupled to the input shaft 106, the sensor target 112 is positioned about the input shaft 106. The rivets 127 are inserted into the bores 159 of the coupling flanges 150 to couple the sensor target 112 to the carrier 122 of the planetary gear set 120. The sensor 110 is coupled to the transmission case 118 such that the sensor axis SA is aligned with a center of one of the targets 170 of the target flange 154, and the sensor 110 is placed in communication with the controller 34. The torque converter 104 is coupled to the input shaft 106. The remainder of the transmission system 22 is assembled, and the transmission system 22 is installed in the vehicle 10 such that the crankshaft 102 (FIG. 2) is coupled to the torque converter 104.

With the shaft sensing system 100 assembled and installed within the vehicle 10, during the operation of the vehicle 10, the sensor 110 generates the magnetic field. As the propulsion system 20 turns the crankshaft 102, the torque converter 104 adapts the torque from the crankshaft 102 to drive the input shaft 106. As the input shaft 106 rotates, the carrier 122 of the planetary gear set 120 rotates with the input shaft 106 at the same speed as the input shaft 106. As the sensor target 112 is coupled to the carrier 122 of the planetary gear set 120, the sensor target 112 rotates at the same speed as the input shaft 106. As the sensor target 112 rotates, the sensor 110 observes the changes in the magnetic flux caused by the targets 170 of the target flange 154 passing over the sensor 110 through the transmission torque transfer housing 116. Generally, as the targets 170 pass over the sensor 110, the magnetic flux changes, which results in a pulse generated by the sensor 110. The controller 34 determines the rotation speed of the input shaft 106 based on the number of pulses received per predetermined unit of time given the known number of targets 170 per revolution.

Thus, the shaft sensing system 100 enables the sensor 110 to observe a rotation of the input shaft 106 indirectly via the planetary gear set 120 and to generate sensor signals that indicate the speed and direction of the input shaft 106 efficiently. By providing the back biased tunnel magnetoresistance sensor 110, the sensor target 112 does not need to include magnets or is not magnetized, which reduces a weight of the sensor target 112 and also reduces manufacturing complexity associated with the sensor target 112. Moreover, the shaft sensing system 100 enables an accurate detection of the direction and the rotation speed of the input shaft 106 even through the transmission torque transfer housing 116 and the large air gap 114. In addition, by providing the sensor target 112 devoid of magnets, eddy currents generated within the torque transfer housing 116 are reduced, which reduces an amount of energy lost as heat. This reduction in eddy currents and energy loss may also improve a fuel economy of the vehicle 10. Further, by providing the sensor target 112 without magnets, the sensor target 112 may be more robust and durable during operation of the vehicle 10.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle, comprising:
a transmission system including a shaft configured to rotate about an axis of rotation, the shaft coupled to a gear set, and a non-ferrous housing configured to rotate independently of the shaft;
a shaft sensing system configured to observe a rotation of the shaft about the axis of rotation, the shaft sensing system including:
a sensor target to be coupled to the gear set and configured to rotate with the gear set, the sensor target including at least one target; and
a sensor spaced apart from the sensor target by a gap, the non-ferrous housing positioned within the gap between the sensor and the sensor target, and the sensor is configured to observe the at least one target of the sensor target to determine a rotation speed of the shaft.

2. The vehicle of claim 1, wherein the sensor target includes a body and a target flange, and the at least one target is defined in the target flange.

3. The vehicle of claim 2, wherein the target flange extends axially from the body and forms an outer perimeter of the sensor target.

4. The vehicle of claim 2, wherein the gear set is a planetary gear set including a carrier coupled to a planet gear and to the shaft, and the body includes at least one coupling flange that extends radially from the body to be coupled to the carrier of the planetary gear set.

5. The vehicle of claim 1, wherein the at least one target comprises a plurality of windows, which are defined through the sensor target so as to be spaced evenly apart about a perimeter of the sensor target.

6. The vehicle of claim 1, wherein the sensor is a back biased tunnel magnetoresistance sensor, and the sensor target is devoid of one or more magnets.

7. The vehicle of claim 6, wherein the sensor target is composed of a ferrous material.

8. A vehicle, comprising:
a transmission system including a shaft configured to rotate about an axis of rotation, the shaft including a planetary gear set coupled to the shaft configured to rotate with the shaft, and a non-ferrous torque transfer housing configured to rotate independently of the shaft; and
a shaft sensing system configured to observe a rotation of the shaft about the axis of rotation, the shaft sensing system including:
 a sensor target coupled to the planetary gear set associated with the shaft, the sensor target including at least one window; and
 a back biased tunnel magnetoresistance sensor spaced apart from the sensor target by a gap, the non-ferrous torque transfer housing is positioned within the gap between the back biased tunnel magnetoresistance sensor and the sensor target, and the back biased tunnel magnetoresistance sensor is configured to generate a magnetic field and to observe the at least one window of the sensor target to determine a rotation speed of the shaft.

9. The vehicle of claim 8, wherein the shaft is an input shaft of the transmission system.

10. The vehicle of claim 8, wherein the back biased tunnel magnetoresistance sensor is coupled to a housing associated with the transmission system, and the back biased tunnel magnetoresistance sensor extends along a sensor axis about perpendicular to the axis of rotation of the shaft.

11. The vehicle of claim 8, wherein the sensor target includes a body and a target flange, and the at least one window is defined in the target flange.

12. The vehicle of claim 11, wherein the target flange extends axially from the body and forms an outer perimeter of the sensor target.

13. The vehicle of claim 11, wherein the body includes at least one coupling flange that extends radially from the body to be coupled to a carrier of the planetary gear set, and the carrier of the planetary gear set is coupled to a planet gear and to the shaft.

14. The vehicle of claim 8, wherein the at least one window comprises a plurality of windows, which are defined through the sensor target so as to be spaced evenly apart about a perimeter of the sensor target.

15. The vehicle of claim 8, wherein the sensor target is composed of a ferrous material.

16. The vehicle of claim 8, wherein the sensor target is devoid of one or more magnets.

17. A vehicle, comprising:
a transmission system including a shaft configured to rotate about an axis of rotation, the shaft including a planetary gear set having a carrier coupled to a planet gear and to the shaft, and a non-ferrous torque transfer housing configured to rotate independently of the shaft; and
a shaft sensing system configured to observe a rotation of the shaft about the axis of rotation, the shaft sensing system including:
 a sensor target coupled to the carrier of the planetary gear set and configured to rotate with the carrier of the planetary gear set, the sensor target composed of a ferrous material and including a body and a target flange that forms an outer perimeter of the sensor target, the target flange extending axially from the body and defining a plurality of windows spaced evenly apart about a perimeter of the target flange, and the sensor target is devoid of one or more magnets; and
 a back biased tunnel magnetoresistance sensor spaced apart from the sensor target by a gap, the non-ferrous torque transfer housing is positioned within the gap between the back biased tunnel magnetoresistance sensor and the sensor target, and the back biased tunnel magnetoresistance sensor is configured to generate a magnetic field and to observe the plurality of windows of the sensor target to determine a rotation speed of the shaft.

18. The vehicle of claim 17, wherein the back biased tunnel magnetoresistance sensor is coupled to a housing associated with the transmission system, and the back biased tunnel magnetoresistance sensor extends along a sensor axis about perpendicular to the axis of rotation of the shaft.

19. The vehicle of claim 17, wherein the body includes at least one coupling flange that extends radially from the body to be coupled to the shaft.

20. The vehicle of claim 17, wherein the shaft is an input shaft of the transmission system.

\* \* \* \* \*